Aug. 5, 1952

A. A. HALA 2,605,914

TRUCK LOADING AND UNLOADING APPARATUS ESPECIALLY
SUITED FOR MASONRY UNITS

Filed Sept. 18, 1950

INVENTOR
ALFRED A. HALA
BY
Thomas M. Ferrill, Jr.
ATTORNEY

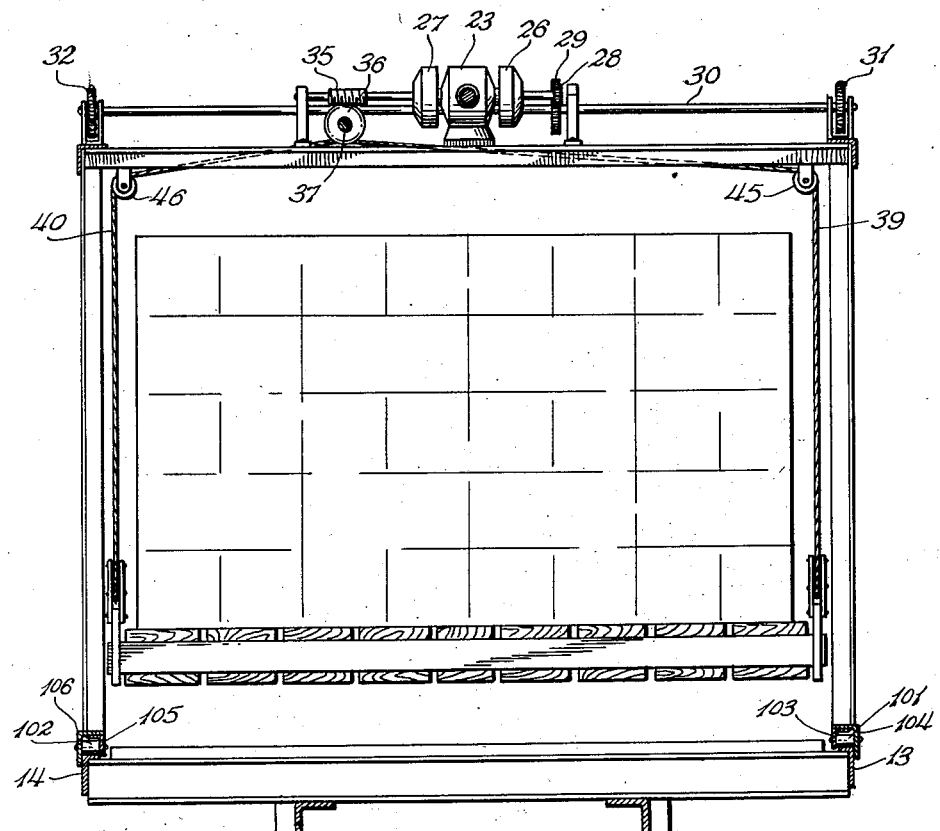
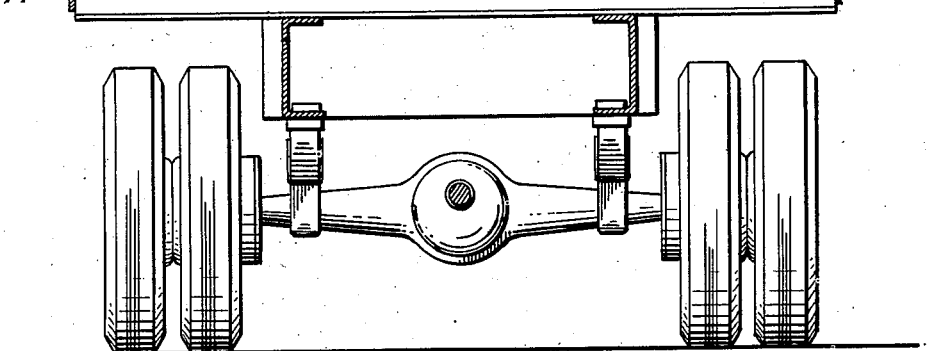
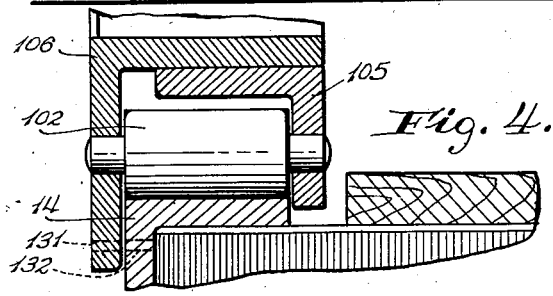

Aug. 5, 1952            A. A. HALA            2,605,914
TRUCK LOADING AND UNLOADING APPARATUS ESPECIALLY
SUITED FOR MASONRY UNITS

Filed Sept. 18, 1950            4 Sheets-Sheet 3

INVENTOR
ALFRED A. HALA
BY
Thomas M. Ferrill, Jr.
ATTORNEY

Aug. 5, 1952　　　　　A. A. HALA　　　　　2,605,914
TRUCK LOADING AND UNLOADING APPARATUS ESPECIALLY
SUITED FOR MASONRY UNITS
Filed Sept. 18, 1950　　　　　　　　　　4 Sheets-Sheet 4

INVENTOR
ALFRED A. HALA
BY
Thomas M. Ferrill, Jr.
ATTORNEY

Patented Aug. 5, 1952

2,605,914

UNITED STATES PATENT OFFICE 2,605,914

TRUCK LOADING AND UNLOADING APPARATUS ESPECIALLY SUITED FOR MASONRY UNITS

Alfred A. Hala, Bay Shore, N. Y.

Application September 18, 1950, Serial No. 185,438

4 Claims. (Cl. 214—65)

The present invention relates to truck loading and unloading mechanism, and is particularly concerned with a system for incorporation on the bed of a truck or a tractor-trailer unit, for loading large heavy objects thereon such as pallet-loads of bricks or other building materials.

Various systems of apparatus have heretofore been devised to be attached to a truck or made a part thereof, for use in loading the truck with its cargo, and conversely, for use in unloading the truck at its destination. In accordance with the present invention, an improved loading and unloading system is provided, wherein the apparatus for handling the units to be loaded is always directly above a unit during the movement thereof, from its position on the ground or loading platform, to its resting position on the bed of the cargo carrier (e. g. the bed of a heavy-duty open trailer). It is an important object of the present invention to provide maximum ruggedness in this way, and withal to have maximum compactness of the system in its condition for travel along the road. It is an accompanying object to avoid reliance upon any cantilever lifting structure, such as a crane or derrick mechanism, and also, to avoid any requirement of travel of a lifting or positioning carriage forward beyond the leading end of the trailer bed.

Another object is to provide motive means for actuating the loading and unloading mechanism, with maximum economy and simplicity of the system for applying the motive power to the loading and unloading operation.

An embodiment of the present invention for achieving the aforedescribed objects is shown in the accompanying drawings wherein:

Fig. 3 is a sectional view taken along the line 3—3 in Fig. 1;

Fig. 4 is a detailed view of a section of the track and a roller unit of the carriage;

Figure 5:
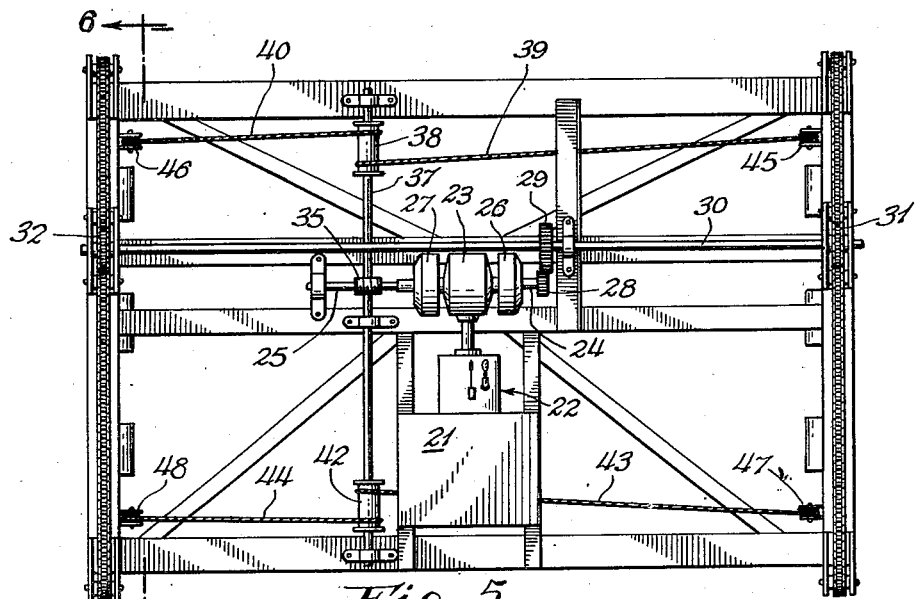
Figure 6:
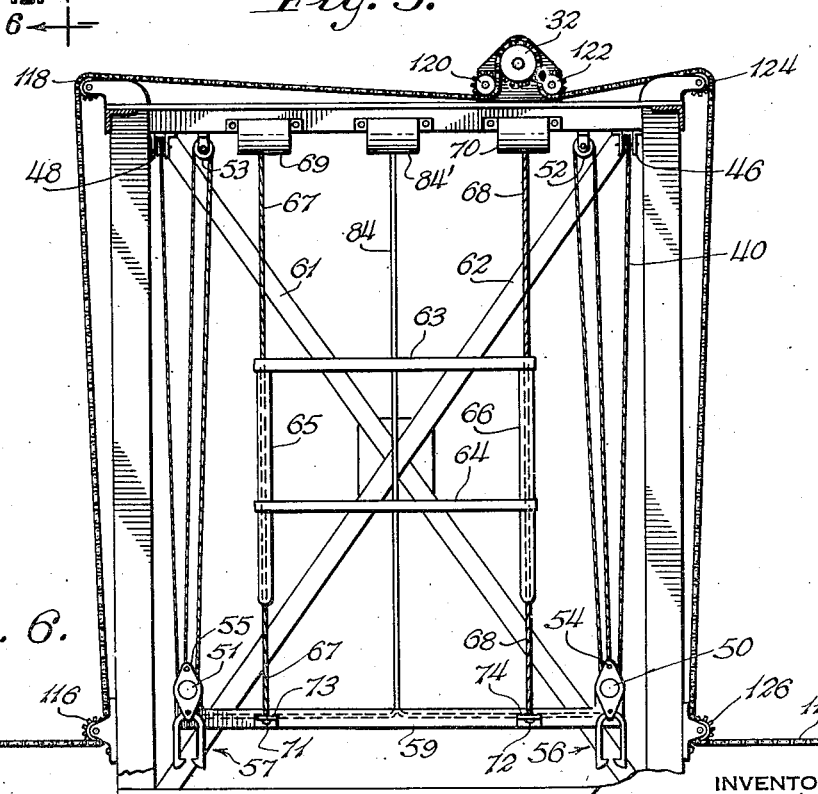
Figure 7:
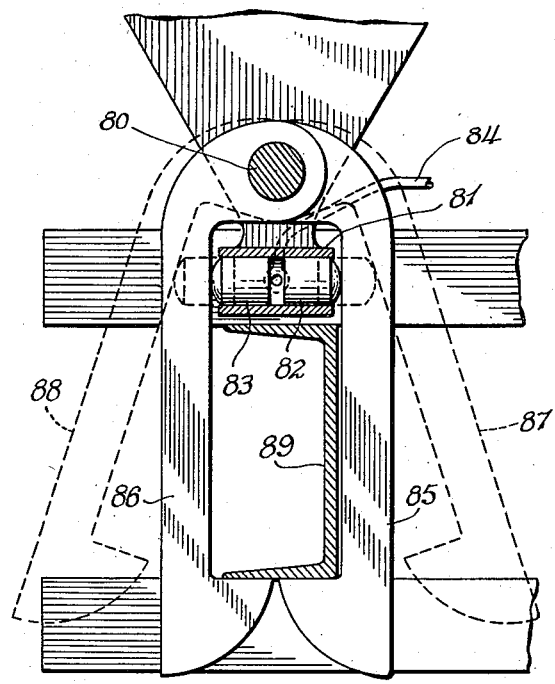
Figure 8:
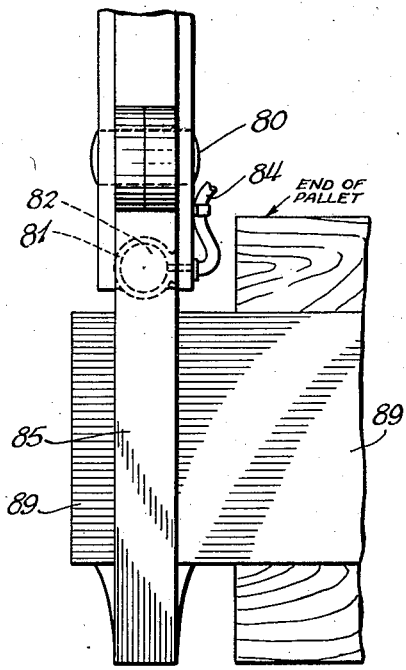

Figs. 5 and 6 are plan and sectional views, respectively, of the carriage, Fig. 6 being taken along line 6—6 of Fig. 5; and Figs. 7 and 8 are side and front elevation views, respectively, of the coupling clasps used for engagement of the end of the channel unit extending through the pallet.

Figure 1:
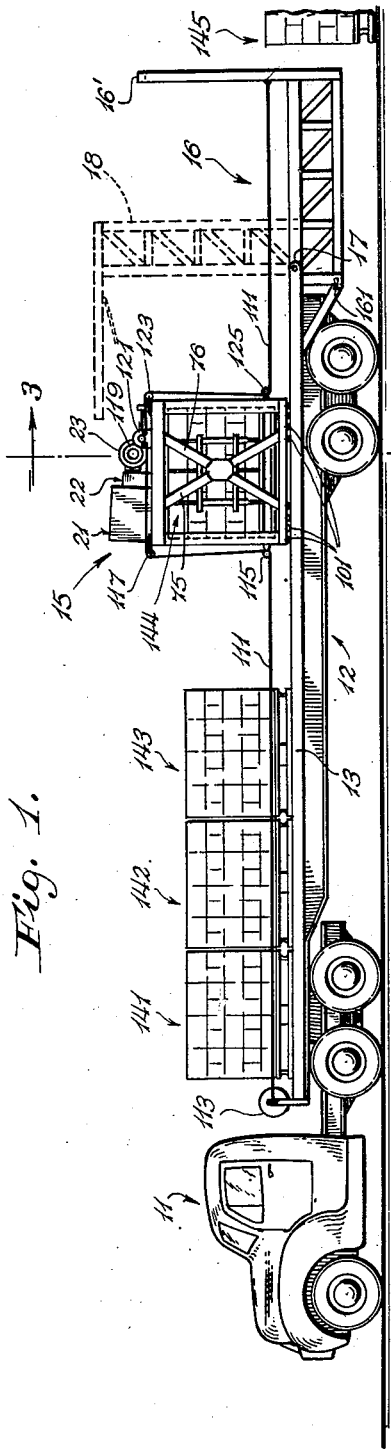
Figs. 1 and 2 are a side elevation and plan view, respectively, of a tractor-trailer system including the automatic loading and unloading apparatus.
Figure 2:
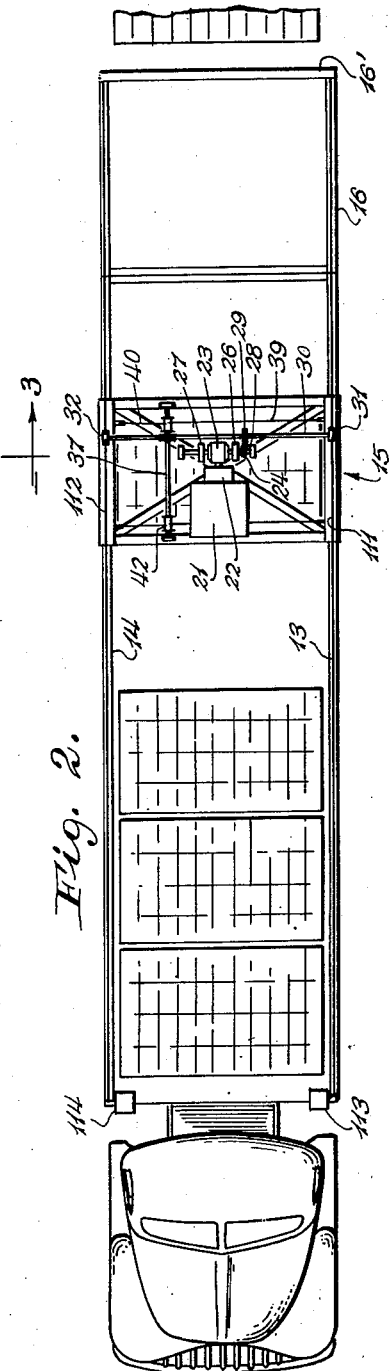

Referring now to Figs. 1 and 2, a heavy duty cargo carrier is shown comprising a tractor 11 and trailer 12, the latter having a flat open bed for hauling objects such as pallet loads of masonry.

Along each of the outer edges of the bed of trailer 12 is provided a track running along the length thereof, the tracks being designated 13 and 14.

A carriage unit 15 supported on a plurality of rollers which are constrained to ride along the tracks 13 and 14, is provided for travel fore and aft over the bed of the trailer 12. The carriage 15 includes a motor provided with a reverse gear and clutch transmission system, and with a differential gear system for permitting the use of the motor alternatively for driving the carriage 15 fore and aft along the rail, or for lifting a load unit up within the carriage, or lowering it into place on the truck bed, or on the ground.

An open track extension system 16 is provided at the extreme rear of the trailer 12, and preferably is hingedly connected as at 17 to the track system fixed to the trailer bed, so that the extension 16 may be swung into a vertical position as shown at 18, when not in use for loading or unloading units. Extension system 16 has vertical side members at the rear end thereof, and a torsion cross-brace 16' across its top.

The purpose of the extension system 16 is to enable the carriage 15 to travel out to the rear of the trailer bed, and to be fully and firmly supported there to enable it to lift a loaded pallet from the ground (or from a platform), or to lower a loaded pallet into place at the destination.

With this arrangement as shown in Figs. 1 and 2, the tractor-trailer unit, when empty, can be backed into the storage yard of the building material supply depot, and, with the rear track extension 16 lowered and locked in place with its extension tracks in line with the tracks fixed to the bed of the trailer 12, the tractor-trailer system 11, 12, is moved slowly in reverse until the sides of the extension 16 have come alongside the first pallet to be loaded. The carriage unit is propelled back onto the rear extension system 16, directly above the loaded pallet, and its hoisting cables are then attached to the pallet and its motive unit is made to raise the pallet up to a level slightly higher than the bed of trailer 12.

The suspension system for the pallet is then locked at this level and the carriage is propelled forward to the front end of the trailer 12, where its motion is arrested and the suspension system is then operated to lower the loaded pallet into place at the front of the bed of trailer 12. The suspension cables are then detached and the carriage 15 is propelled back onto the rearward extension 16, and the truck is then backed up sufficiently to have the sides of the extension system 16 straddle a further loaded pallet, which then is connected to the suspension cable of the carriage 15, raised into position, held there while the carriage is propelled forward to a position immediately to the rear of the first loaded pallet, and the second loaded pallet is then lowered into place on the bed of the trailer 12.

The mechanism which is employed for propulsion of the carriage (and also for raising or lowering the track extension system 16 to or from its vertical position for travel of the tractor-trailer), and for raising and lowering the loaded pallets, will now be described in more detail.

The motive power system for the carriage preferably comprises a single motor 21 which preferably is an internal combustion engine. This engine is provided with a transmission system 22 including reverse gears and a clutch. The output shaft from the transmission 22 is coupled to a differential gear drive unit 23, from which are provided two output shafts 24 and 25, as seen in Fig. 2, and as shown in more detail in Fig. 5.

A brake unit 26 is provided on shaft 24, and a similar brake unit 27 is provided on shaft 25.

Shaft 24 is geared through spur gears 28, 29 to a shaft 30 having sprockets 31 and 32 substantially at the opposite ends thereof. Shaft 25 is connected through a worm 35 and worm gear directly therebeneath to a shaft 37, on each end of which is provided a windlass drum, a pair of cables being anchored in each windlass drum. Drum 38 is provided with cables 39 and 40, and windlass drum 42 is provided with cables 43 and 44.

Cables 39, 40, 43 and 44 pass over pulleys 45, 46, 47 and 48, respectively, and thence extend substantially vertically downward to block and tackle systems including lower blocks attached to clasp mechanisms and also attached to cross bars, and including also upper sheaves attached to the rigid members of the top frame structure of the carriage. The details of this arrangement are illustrated in the sectional view in Fig. 6, a view taken along the line 6—6 in Fig. 5. Pulleys 46 and 48 are visible in the upper right and left corner of this view. Cable 40 passes downward from pulley 46, over the pulley wheel of block 50, thence upward to sheave 52, and down again to a point of attachment 54 at the top of the block 53. Similarly, cable 44 passes downward from pulley 48, around the pulley wheel of block 51, thence upward over sheave 53, and finally, down to its point of attachment 55 at the top of block 51. Clasps 56 and 57 are attached to the bottom portions of blocks 50 and 51, respectively. Each of these clasps includes a pair of hinged tongs especially adapted for engaging a channel iron or I beam unit of the size to be extended through a pallet, as illustrated in Figs. 7 and 8.

The clasps 56 and 57 and the blocks 50 and 51 are attached to the opposite ends of a cross bar 59 which hangs at all times horizontal and parallel to the side of the carriage. A guiding system thereof is provided on the cross brace members 61 and 62 of the carriage, this guiding mechanism includes a pair of horizontal fixed members 63 and 64 rigidly supporting vertical tubular members 65 and 66. Through these tubular members, cables 67 and 68 paid out by torsion boxes 69 and 70, respectively, extend downward to enlarge head units 71 and 72 engaging lugs 73 and 74, respectively, on the cross bar 59. The lugs 73 and 74 are provided with clearance holes sufficiently large to permit passage therethrough of tubular members 65 and 66, so that when the cross bar 59 is raised upward by the action of shafts 25 and 37 and windlass drums 38 and 42, torsion boxes 69 and 70, exerting predetermined tensions on tables 67 and 68, tend to provide alignment of cross bar 59 with lugs 73 and 74 directly beneath tubular members 65 and 66, until the cross bar has reached the lower end of the tubular members 65 and 66. Thereafter, further raising of the cross bar 59 brings the lugs 73 and 74 to pass upward along the tubular members 65 and 66, the torsion box alignment cables 67 and 68 thereafter remaining fixed with their enlarged lower ends 71 and 72 stopped by the lower ends of tubular members 65 and 66.

A similar set of guide tubes and guide cables and torsion boxes is provided at the opposite side of the carriage 15, as indicated generally in Fig. 1.

Preferably, remote control means are provided for simultaneously opening all of the four clasps immediately after the loaded pallet has been loaded into a position of rest, either on the truck bed (in loading) or on the ground or platform (in unloading). Such remote control means may be arranged for pneumatic operation, as illustrated in Figs. 7 and 8, with a pneumatic cylinder 81 containing two pistons 82 and 83 symmetrically positioned therein, and arranged to be displaced outward by pneumatic pressure supplied through tube 84, piston 82 pushing tong 85 outward (to the right as seen in Fig. 7), and piston 83 pushing tong 86 outward (to the left as seen in Fig. 7), to the outwardly displaced position indicated in the dotted lines at 87 and 88.

A section of a channel member 89 is illustrated in the grip of the closed tongs 85 and 86, the channel 89 being typical of a rigid member for inclusion in the pallet, the ends of the channel or light member 89 projecting a short distance beyond the end of the pallet, as illustrated in Figs. 8 and 3.

The construction of the tracks 13 and 14 and the arrangement of the rollers and track guides on the carriage 15 are illustrated in Figs. 3 and 4. The tracks 13 and 14 preferably comprise appreciable lengths of heavy angle iron stock with a narrow web serving as the top track surface for the rollers. The rollers are provided in a pair of pieces of angle stock, a series of several rollers being provided in such a pair of angle pieces at each end of the carrier, i. e., on each one of the two side rails. The rollers 101 on one side of the carriage, roll on track 13, and the rollers 102 at the opposite side roll on track 14. Rollers 101 are supported between a smaller angle stock 103 and a larger outer angle stock 104, and similarly rollers 102 are supported between angle stock 105 and a larger angle stock 106. Angles 105 and 106 are cut to lengths corresponding to the fore-and-aft dimension of the carriage, and may be provided with two groups of four rollers each, for example, in the manner generally indicated in Fig. 1.

The vertical-extending webs of angle 105 and angle 106 are selected for such depth of extension as to travel alongside rail 14, and thus to supply guiding action, preventing the carriage 15 from becoming derailed.

The traction system for propulsion of the carriage 15 fore and aft along the trackways 13, 14 therefore, comprises a pair of chain cables 111 and 112, fastened at their rearward ends to the vertically extending frame members of rear extension 16, and at their forward ends to a pair of windlass drums on a pair of torsion boxes 113 and 114, at the front ends of the trailer bed. These torsion boxes 113 and 114 are provided with limit stops which positively prevent the chain cables 111 and 112 from developing any slack when the rear extension 16 is lowered into its position for loading and unloading operations.

Chain cable 111 passes over pulleys 115 and 117 and along the top of the carriage 15, to a pulley 119 which compels the chain cable to make contact with sprocket 31 over a very large angular sector thereof. Thence, the chain cable 111 passes downward from the rear surface of sprocket 32, around a further pulley 121, thence over pulley 123 and under pulley 125, whence it continues along a horizontal line to its point of attachment to extension 16. A set of similar pulleys 116, 118, 120, 122, 124, and 126 are provided at the opposite end of the carriage 15, as shown in Fig. 6, cooperating with chain cable 112 and sprocket 32 similarly to the respective ones of the pulleys aforedescribed in connection with chain cable 111.

Latches are provided at each side of the track extension 16, for locking the girder sub-structure thereof to the braced vertically downwardly extending members at the rear of the trailer bed, against which the track unit extensions abut. Moreover, locking pins are provided for passage through registering bores through angle 106 and track 14, at one side of the trailer, and similar registering bores are provided at the opposite side. The bores in angle 106 and in track 14 are indicated in Fig. 4 at 131 and 132, respectively. These bores are provided to register when the carriage 15 is at the extreme forward position of its travel along the track 13, 14.

Through the use of locking pins in these bores through the side angles and the tracks, the carriage 15 may be locked in its extreme forward position, and the motor applied to the traction cables 111 and 112 in the direction normally to provide rearward movement of the carriage 15, the latches locking extension 16 down having first been released. With this motor action, the extension 16 is pulled up into its fully raised position for travel of the tractor-trailer combination 11, 12. The torsion boxes 113 and 114 operate under these conditions to reel in the slack developed in the cable 111 and cable 112, between pulleys 115 and 116 on the carriage and torsion boxes 113 and 114, respectively.

Figs. 1 and 2 show the trailer partly loaded, with three loaded pallets 141, 142, and 143. A fourth loaded pallet 144 is suspended within carriage 15, which is in transit forward toward a position directly behind loaded pallet 143. A further loaded pallet 145 rests on the ground behind the extension 16. Extension 16 is locked down, and the power unit 21 is in operation, with its power being transmitted through transmission 22 and differential 23, by way of shaft 24, gears 28 and 29, and shaft 30, to the sprockets 31 and 32 engaging cables 111 and 112, respectively. The direction of rotation of the sprockets 31 and 32 is clockwise, as seen in Figs. 1 and 6. Brake unit 27 is engaged, for preventing the motive power transfer into shaft 25. Accordingly, shaft 37 is locked against rotation both by the worm and gear systems and by the braking action at 27, holding the load suspended at a fixed height clearing the bed of the trailer 12.

When the carriage 15 has been propelled forward to the desired position just behind loaded pallet 143, the clutch in 22 is released and braking is applied at 26, brake 27 being released.

The transmission system 22 is then set for driving shaft 37 in the direction to pay out the suspension cable from windlasses 38 and 42, lowering the loaded pallets gradually onto the bed of the trailer 12. Then pneumatic pressure is applied to flexible tubing 84, which preferably is payed out through a torsion box 84' as seen in Fig. 6, forcing open the tongs of the clasps and leaving them entirely free of engagement with the beam extensions of the pallet.

Thereupon, the reversing gear of the transmission 22 is operated and the clutch is engaged to raise the cross bars and clasps for clearance with respect to the truck bed; and the clutch is next released, brake 27 is applied and brake 26 is released. The clutch is again engaged, this time providing counterclockwise rotation of sprockets 31 and 32 as seen in Fig. 1, propelling the carriage 15 rearward until it reaches a position on the tracks over the extension 16.

The tractor-trailer system itself is thereupon operated in reverse to bring the extension 16 and the carriage 15 thereon to a position directly above the next loaded pallet 145, the clutch is released, the braking action transferred from unit 27 to unit 26, the transmission reversed, and the clutch engaged to lower the cross bar and clasps to the level of the pallet. The clasps are then made to engage the beam extensions of the loaded pallet 145, and the reverse gear is operated to cause the motor unit 21 to operate to raise the loaded pallet 145 up to the level above the truck bed, the clutch is released, brake 27 is set, brake 26 is released, and the clutch is engaged for operation in the direction to drive the shaft 30 in the direction to propel the carriage forward to a position behind loaded pallet 144.

The procedure of stopping the carriage 15 at the proper location, braking it, and lowering the loaded pallet is then repeated, the clasps are released, and the cross bars and clasps are again raised, as described above in detail in connection with loaded pallet 144.

After the completion of the loading of unit 145, assuming that five loaded pallets substantially fill the tractor-trailer system 11, 12 to capacity, or to the extent desired for a particular delivery, the carriage is now operated with the motive unit 21 driving the carriage forward to a position directly over loaded pallet 141, i. e., to the foremost position over the bed of trailer 12.

With the carriage in this position, a pin is inserted through registering passages or bores 131 and 132 (Fig. 4) in the carriage guide flange and the flange of the track, and a similar pair of registering bores are pinned together at the opposite side of the carriage.

The latch 161 at the bottom front juncture of the trailer extension is released, and the motive system 21, 22, 23 is operated in the direction to normally provide propulsion of the carriage 15 toward the rear of the trailer. With the carriage locked and the trailer extension unlocked, this provides tension in the rearmost parts of cables 111 and 112, pulling the extension 16 up into its raised position as indicated at 18 in Fig. 1.

The torsion boxes 113 and 114 take up the slack in the cable system, during this operation.

When the loaded truck has been driven to the building site or other destination for the supplies thereon, it is backed into position for unloading the first pallet, and the motive system 21, 22, 23 is operated in the reverse direction, to lower the extension 16 into its working position. The extension 16 is then locked down, the pins are removed from the sides of the carriage 15 to release the carriage for propulsion along the tracks 13 and 14, and the rear extension 16 is latched in place by operation of the latches 161.

The carriage is then operated with its motive system first being used in propulsion, then in lifting the rearmost pallet, then again in propulsion to the position on the extension 16, then in lowering the load to its position on the ground or dock or other receiving area.

The motive system is thereupon operated to raise the cross bars up above the level of the truck bed, and the tractor-trailer combination is driven forward through a distance slightly greater than the width of one pallet. With the tractor-trailer combination thus relocated, the carriage is again operated in forward propulsion to pick up another loaded pallet and carry it to the rear extension 16 for lowering it into the next position.

Figs. 1 and 2, initially described as showing the system in operation in loading the truck, are equally applicable to the unloading operation, and may be taken as representing the position of the carriage 15 in rearward travel with a second pallet 144, to take it out over the extension 16 for lowering it into place at the site.

The system of the present invention provides advantages of very great strength and ruggedness and durability, far in excess of systems relying upon cantilever action, such as loading and unloading systems including cranes. It also enjoys an advantage in its very great compactness, since the carriage 15 is not ever required to be propelled forward beyond the front end of the trailer 12, and since the rear extension 16, when raised into position 18 for travel of the system, does not cause appreciable overhang at the rear beyond the normal trailer bed length.

While the system has been illustrated as applied to a tractor-trailer type of heavy duty trucking system, it will be readily apparent that it can be applied also to a truck whereon the motor and cab and truck bed are interconnected through one rigid framework.

The carriage 15 may be provided with a seat for an operator to ride thereon and to operate manual or pedal controls for the clutch and reverse gear and the brakes 26 and 27, or remote control features may be provided for operation of the carriage motive system from a position on the ground alongside the loading and unloading position, the remote control equipment being electrical or hydraulic, as desired, and control systems of this type being well known to those skilled in the art.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. Truck loading and unloading apparatus, comprising a pair of parallel rails extending along the sides of the truck bed, a carriage movable fore and aft along said rails, a track extension unit attached to said truck bed at the rear end thereof and extending rearward an appreciable distance therebeyond, said carriage being movable aft beyond the rear end of said truck bed and onto said track extension unit, reversible hoisting means on said carriage unit for lifting a load unit therefor through said track extension unit and thereabove within said carriage and for selectively lowering the load unit, a pair of traction cables extending along the respective sides of said truck bed, said traction cables being connected at their front ends to points fixed to said truck bed and being connected at their rear ends to said track extension unit, and means including traction wheel means on said carriage engaging said cables for propulsion of said carriage between the forward end of said truck bed and a position upon said track extension unit; said truck loading and unloading apparatus further including means for locking said carriage at a predetermined forward position in its travel along the rails, said track extension unit being hingedly attached to said truck bed, and being provided with selective latching means for locking it in alignment with said truck bed or releasing it to be raised from its horizontal position, said traction chain cable and propulsion means being thereby enabled to pulled said track extension unit upward into its raised position.

2. Truck loading and unloading apparatus, comprising a pair of parallel rails extending along the sides of the truck bed, a carriage movable fore and aft along said rails, said carriage having a substantially rectangular base outline, the smaller dimension thereof being parallel to said rails, a track extension unit attached to said truck bed at the rear end thereof and extending rearward an appreciable distance therebeyond, said carriage being movable fore and aft beyond the rear end of said truck bed and onto said track extension unit, reversible hoisting means on said carriage unit for lifting a load unit therefor through said track extension unit and thereabove within the said carriage and for selectively lowering the load unit, and reversible means for propulsion of said carriage between the forward end of said truck bed and a position upon said track extension unit; said hoisting means including four suspension cable systems, one depending from each corner at the top of said carriage, a clasp at the bottom of each of said four suspension cable systems, and a cross-bar at each side of said carriage spacing apart the front and rear clasps at the side thereof.

3. Truck loading and unloading apparatus as defined in claim 2, each of said clasps including pressure-operated piston release means.

4. Truck loading and unloading apparatus as defined in claim 2, further including a pair of torsion boxes at the top of said carriage above two respective intermediate points on each of said cross bars, a pair of vertical alignment control tubular members intermediate said torsion boxes and said respective intermediate points on said cross bars, and cables paid out by said torsion boxes through said tubular members to said respective intermediate points on said cross bars.

ALFRED A. HALA.

REFERENCES CITED

The following references are of record in the file of this patent:

UNITED STATES PATENTS

| Number | Name | Date |
|---|---|---|
| 1,345,175 | Hall | June 29, 1920 |
| 1,918,419 | Needham | July 18, 1933 |
| 2,156,424 | Barnard | May 2, 1939 |
| 2,177,525 | Henderson | Oct. 24, 1939 |
| 2,334,295 | Stofflet | Nov. 16, 1943 |
| 2,442,549 | Pearlman | June 1, 1948 |
| 2,478,513 | Te Desco | Aug. 9, 1949 |
| 2,504,232 | Smith | Apr. 18, 1950 |